(12) United States Patent
Monks et al.

(10) Patent No.: US 8,274,662 B2
(45) Date of Patent: Sep. 25, 2012

(54) OPTICAL TRIANGULATION SENSOR

(75) Inventors: Tim Monks, Bristol (GB); Steve Robinson, Bristol (GB)

(73) Assignee: Third Dimension Software Limited, Bristol (GB)

( * ) Notice: Subject to any disclaimer, the term of this patent is extended or adjusted under 35 U.S.C. 154(b) by 311 days.

(21) Appl. No.: 12/671,098

(22) PCT Filed: Jul. 29, 2008

(86) PCT No.: PCT/GB2008/002593
§ 371 (c)(1),
(2), (4) Date: Jan. 28, 2010

(87) PCT Pub. No.: WO2009/016367
PCT Pub. Date: Feb. 5, 2009

(65) Prior Publication Data
US 2010/0195116 A1    Aug. 5, 2010

(30) Foreign Application Priority Data
Jul. 31, 2007 (GB) .................................. 0714974.3

(51) Int. Cl.
*G01B 11/24* (2006.01)
(52) U.S. Cl. ........................................................ 356/604
(58) Field of Classification Search .................. None
See application file for complete search history.

(56) References Cited

U.S. PATENT DOCUMENTS

| | | | |
|---|---|---|---|
| 4,666,303 A | 5/1987 | Pryor | |
| 5,416,590 A | 5/1995 | Stover et al. | |
| 5,818,061 A * | 10/1998 | Stern et al. | 250/559.29 |
| 599,265 A | 12/1999 | Dalacon et al. | |
| 6,636,310 B1 | 10/2003 | Ben-Dov et al. | |
| 6,700,669 B1 | 3/2004 | Geng | |
| 7,489,408 B2 | 2/2009 | Harding et al. | |
| 7,528,400 B2 * | 5/2009 | Duck et al. | 250/559.23 |
| 7,542,135 B2 | 6/2009 | Mead et al. | |
| 7,643,151 B2 | 1/2010 | Strahle | |
| 2007/0019181 A1 | 1/2007 | Sinclair et al. | |
| 2008/0266577 A1 | 10/2008 | Prouvost et al. | |

FOREIGN PATENT DOCUMENTS

DE    10 2004 043209    3/2006

OTHER PUBLICATIONS

International Search Report for PCT/GB2008/002593, Feb. 12, 2008.
Written Opinion of the Searching Authority for PCT/GB2008/002593.

* cited by examiner

*Primary Examiner* — Tu Nguyen
(74) *Attorney, Agent, or Firm* — Stites & Harbison PLLC; Douglas E. Jackson

(57) ABSTRACT

An optical, such as a laser, triangulation sensor is disclosed in which a configuration of an output light beam is controlled using a mask in front of a light source. The configuration may include a plurality of coplanar spatially separated planar light beams. The mask may be movable to provide different light beam configurations. Masking parts of the light beam enables unwanted features on the measurement surface to be omitted. Also disclosed is a guide element for an optical sensor for facilitating hole diameter measurement. The guide element has contact surfaces lying on a virtual conical surface which abut the hole edge to enable consistent placement of the light beam with respect to the hole centre. Also disclosed is a guide element for an optical sensor having an aperture for framing surface features, such as a rivert to permit accurate location of the light beam therewith.

15 Claims, 8 Drawing Sheets

OPTICAL TRIANGULATION SENSOR

FIELD OF THE INVENTION

This invention relates to measurement apparatus which uses triangulation principles to measure the physical geometry of articles and/or their relative position to each other. For example, the invention may be used with a laser triangulation sensor.

BACKGROUND TO THE INVENTION

Optical measurement systems which use a laser triangulation sensor to obtain dimensional information about objects are known. For example, such systems may be arranged to determine the distance of objects from the sensor or the profile of objects within the field of view of the sensor.

Referring to FIG. 1, a conventional laser triangulation measurement device 1 comprises a light source 2 e.g. laser which is arranged to project a planar beam 4 (e.g. sheet) of light. The planar beam 4 is incident as a line 8 on an object or objects 5, 6 which lie in the field of view 7 of the device 1. Light reflected from the incident line 8 is collected by an imaging device 3, which may be a camera (e.g. having a charge coupled device (CCD) or an active pixel sensor (CMOS) device).

The images captured by the imaging device 3 are processed to determine a data representation of the physical geometry of the objects 5, 6. The processing may involved reference to a calibrated look up table or the like. Such processing is known.

FIG. 2 depicts two dimensions that may be determined using the data representation. The separation (gap G) or planar misalignment (mismatch or flush F) between adjacent surfaces may be determined, e.g. by performing suitable mathematical operations (e.g. line/radius fitting).

An example of a conventional optical triangulation sensor is the GapGun, manufactured by Third Dimension Software Limited.

SUMMARY OF THE INVENTION

The present invention is concerned with aiding the location of the planar light beam of an optical triangulation sensor to facilitate interpretation of a captured image. Three aspects, which are presented independently but may be combined, are discussed below. In general, they all concern adapting an optical triangulation sensor to permit a user to locate the planar light beam with respect to a feature on a measurement surface in a consistent and repeatable manner.

Multiple Beam Emitter

The measurement of certain surfaces or objects can be difficult due to the arrangement or complexity of the objects being measured. In particular, it can be difficult to find reference points on the data representation on which to base calculations. FIG. 3 illustrates one example, where it is desirable to measure a gap and flush condition between two flat panels 10, 11 which are separated by a joint filled with sealant 12. FIG. 4 shows a cross-section through this arrangement, where it can be seen that the fillet of sealant 12 can form a flat surface between the two panels 10, 11. This condition may make it difficult to identify the location of the edges of each panel 10, 11 from the image captured by a camera of an optical triangulation sensor (not shown). Typically, the image of the structure shown in FIG. 3 is represented as a continuous line of data with little or no way to determine the finite edge of either or both panels.

FIG. 5 depicts the cross-section of another situation where it is difficult to ascertain a particular feature. Here measurement is made over an area where several features exist in close proximity to each other. In this case it can be difficult to identify the specific measurement point from the image when the data contains several possible measurement conditions. This problem may be typical of measurement of features on automotive interior fascia panels. For example, if in FIG. 5 an attempt is made to measure the gap and/or flush of a junction 17 between features 14 and 15, it can be difficult to distinguish junction 17 from nearby junctions 17a, 17b on the data representation obtained from the captured image.

At its most general, the first aspect of the invention provides an optical triangulation sensor in which the emitted planar light beam is configured for a predetermined measurement condition. For example, the planar light may be patterned, i.e. includes one or more discontinuities which appear as one or more gaps in a line projected by the beam on a surface, or it may have a controlled width, e.g. project a line of predetermined length on a suitably distant measurement surface. Where the planar light is patterned, the pattern may be a series of visually distinguishable regions in the planar light, e.g. regions of differing intensity (dim or bright), regions of differing colour (achieved by passing the light through filters or the like) or by having a gap or gaps in the planar light beam. The pattern of the planar light may be positioned by a user with respect to features to be measured to aid measurement, e.g. by providing a reference point in the captured image (e.g. a blank region from which little or no reflected light is received).

The first aspect of the invention may be expressed as an optical triangulation sensor comprising: a light source arranged to emit a plurality of discrete planar light beams which lie spatially separated from each other along a common plane; and a detector located out of the common plane for detecting light from the planar light beams that is reflected at an angle to the common plane. When the plurality of light beams are projected on to a measurement surface, they form a dashed line, i.e. a plurality of lines (corresponding to the planar light beams) separated by one or more spaces.

Alternatively, the first aspect of the invention may be expressed as an optical triangulation sensor comprising: a light source arranged to emit a planar light beam; a detector located out of the plane of the light beam for detecting light from the planar light beam that is reflected at an angle to that plane; and a mask for restricting one or more portions of the emitted planar light beam to produce an output planar light beam having a predetermined configuration. Herein restricting the light means altering it in some way to make the different regions distinguishable from each other, e.g. visually distinguishable by a user. Thus, restricting may include filtering, e.g. to change the colour or intensity of a portion of the planar light, or blocking, e.g. to prevent a portion from being transmitted.

By restricting the line of light projecting from the measurement device to form a predetermined pattern it may be possible to measure features which would be otherwise impossible or difficult to measure consistently. The limitation of the planar illumination source can allow unwanted features within the measurement view to be omitted from the measurement, and may provide a reference point in the image for permitting consistent identification of features on the measurement surface.

The light source may include a beam generator e.g. of the conventional type for generating a planar light beam (e.g. a single planar beam) and a mask lying in the plane of the single planar light beam, the mask being arranged to generate the plurality of planar light beams from the single planar light beam. For example, the single planar light beam may lie on the common plane and the mask may include one or more opaque or partially opaque (translucent) portions locatable in the common plane (e.g. between the beam generator and a measurement surface). Each opaque portion may be arranged to block part of the single planar light beam. The plurality of planar beams may therefore be generated by splitting or selectively blocking parts of a single planar beam.

The mask may be arranged to block the planar beam invention to form a predetermined pattern of discrete planar light beams. The pattern may be selected to match a particular (known or assumed) configuration of an object (e.g. surface) to be measured. For example, the discrete planar beams may be selected such that the gap or gaps between them at a certain distance from the sensor may correspond to the expected (e.g. assumed) size of a surface feature or the expected separation of components which it is desirable to ignore in the measurement.

In an alternative embodiment, the mask may comprise a translucent body e.g. including a coloured filter or the like for conferring a predetermined pattern in the planar light. As mentioned above, the predetermined pattern may include regions that are visually distinguishable from one another to enable a user to locate the pattern relative to a measurement surface e.g. relative to features on that surface.

The mask may be adjustable to vary the configuration (e.g. pattern) of the planar light beam. The number of discrete planar light beams may be variable. Thus, the light beam may be masked on a measurement by measurement basis i.e. each measurement may have a mask customised for its particular situation.

The mask may be a generally opaque plate positioned to block the planar light beam, the opaque plate having a plurality of light-transmitting window portions therethrough which are locatable on the common plane to transmit spaced portions of the single planar light beam. The opaque plate may be movable relative to the common plane to locate different combinations of window portions on the common plane, thereby to permit the number or configuration of discrete planar light beams to be altered.

The sensor may include a detector for detecting the configuration of the planar light beam. For example, the detector may be arranged to detect the position of the mask or other movable element whose position is indicative of the mask position. In one embodiment, the mask may be movable in by rotating a sensor cap. The mask position may be detected by sensing the angular position of the cap, e.g. using an angular sensor or by having suitably positioned binary sensors which can sense the alignment of the cap or the mask. For example, if the mask has three configurations, corresponding e.g. to three angular positions of the cap, at least two binary sensors may be required to determine which of the angular positions the cap occupies.

In an alternative embodiment, the mask may be implement using a light crystal display (LCD) located in the path of the planar light beam. Suitable voltages applied across the LCD may permit regions which are opaque or partially opaque to restrict portions of the planar light beam. The voltages may be adjustable to permit different configurations of opaque/partially opaque regions to be used.

The light source may include a laser. Any laser used in conventional optical triangulation sensor may be suitable. The laser may be class 3 or lower. For example, it may be a class 2M or 3R. The intensity of the laser may be adjustable (e.g. automatically adjustable) for different optical properties of surfaces to be measured.

The detector may be any suitable imaging device, e.g. a camera incorporating a charge coupled device (CCD) or an active pixel sensor (e.g. CMOS device).

Beam Guide for Hole Measurement

It is often desirable to measure accurately the diameter (or radius) or edge profile of a hole formed in a measurement surface. For example, it may be particularly useful for measuring the edge profile of a countersink (i.e. a hole whose opening is tapered to receive a conical screw head or the like). To perform measurements of this type using an optical triangulation sensor it is necessary for the measurement axis (i.e. the line formed on the measurement surface when the planar light beam is project thereon) to lie across the centre of the hole (i.e. on a diameter). For accurate measurements, the axis of the hole preferably lies in the plane of the light beam.

In practice this is often done by eye, e.g. relying on a user's judgement. This limits the accuracy and repeatability of measurements.

At its most general, the second aspect of the invention provides an optical triangulation sensor having a guide element for centering the planar light beam across a hole. The guide element provides a body receivable in the hole which may permit consistent and repeatable alignment, yet may avoid the problem of obscuring the planar light beam incident on the edges on the hole and reflected therefrom.

Thus, according to the second aspect of the invention, there may be provided an optical triangulation sensor comprising: a light source arranged to emit a planar light beam; a detector located out of the plane of the light beam for detecting light from the planar light beam that is reflected at an angle to that plane; and a guide element attached to the light source for positioning the planar light beam relative to a hole to cause the plane of the light beam to pass through a diameter of the hole, wherein the guide element includes a body receivable in the hole, the body having contact surfaces for abutting the hole circumference, the contact surfaces lying on a virtual conical surface whose axis is in the plane of the light beam, and wherein there is a void in the body at each intersection between the virtual conical surface and the plane of the light beam. Each void may therefore define a path for the planar light beam from the light source to the edge of the hole. The same or different voids may be provided which define a return path for reflected light between the edge of the hole and the detector.

The guide element may permit placement of the sensor relative to the hole such that the planar light beam lies through the centre of the hole yet is not blocked from reaching the edge of the hole nor from reaching the detector after reflection from the edge of the hole.

The guide element may allow consistent and repeatable alignment of the plane of the light beam with respect to the hole. The position of the measurement axis (i.e. the line formed on the measurement surface when the planar light beam is project thereon) relative to the hole may be known more accurately, which can facilitate the accurate measurement of the radius/diameter of the hole and its edge profile. This can reduce error and uncertainty associated with measurements made relying on user judgement.

The body may include contact surfaces on both sides of the plane of the light beam. This can increase the stability of the guide element when it abuts the hole edges.

The body may comprise three or more fins which extend away from a common junction, each fin having a distal edge which lies on the virtual conical surface. The distal edges therefore provide the contact surface. The fins may be elongate, whereby the distal edges slope away from the light source. The body may therefore be receivable in holes of differing diameters.

The common junction may be offset from the plane of the light beam. This may reduce the amount the body interferes with the planar light beam. The common junction may be on the opposite of the plane of the light beam from the detector so that it does not interfere with light reflected from the hole edges towards the detector.

The fins may be spaced at equal angular intervals. In one embodiment there are three fins. This may be a particularly stable configuration.

The body may be tapered to a point corresponding to the apex of the virtual conical surface. Aligning the point of the body with the centre of the hole may be one way to ensure that the axis of the hole lies in the plane of the light beam.

Other ways of aligning the plane of the light beam with the axis of the hole (i.e. so the hole axis lies in the plane of the light beam) may include providing one or more marks, e.g. lines or other regular demarcations, at corresponding positions on each fin. A user could then ensure that each fin was inserted to the same mark. Alternatively, the sensor may include a support stand for resting on the measurement surface adjacent the hole to ensure proper alignment of the body with the hole. The support stand may have two spaced contact feet to provide a stable tripod structure when used in conjunction with the guide element. Another alternative is to provide an additional optical marker, e.g. a light spot, which may be projected on to the measurement surface at a known distance from the plane of the light beam. The distance between the optical marker and the planar light beam can be determined from an image captured by the detector. The sensor may therefore indicate when the planar light beam is aligned with the axis of the hole.

Each void may define a region extending circumferentially around the virtual conical surface and radially inwards towards the axis of the virtual conical surface. The circumferential extent may be on the same side of the plane of the light beam as the detector to provide a path for reflected light from the intersection of the virtual conical surface and the plane of the light beam to the detector. Separate voids may be provided for an incident light path (corresponding to the plane of the light beam) and a reflected light path.

It may be desirable to minimise the amount of material of the body present within the volume defined by the virtual conical surface since that material may obstruct the planar light on its way to the measurement surface or the return light from the surface received by the detector. Thus, each void may extend substantially to the axis of the virtual conical area. The fins may thus be thin flat plates of material.

The light source may include a laser. Any laser used in conventional optical triangulation sensor may be suitable. The laser may be class 3 or lower. For example, it may be a class 2M or 3R. The intensity of the laser may be adjustable (e.g. automatically adjustable) for different optical properties of surfaces to be measured.

The detector may be any suitable imaging device, e.g. a camera incorporating a charge coupled device (CCD) or an active pixel sensor (e.g. CMOS device).

The second aspect of the invention may alternatively be expressed as a guide element for positioning a planar light beam from an optical triangulation sensor relative to a hole to cause the plane of the light beam to pass through a diameter of the hole, the guide element including a body receivable in the hole, the body having: contact surfaces for abutting the hole circumference, the contact surfaces lying on a virtual conical surface whose axis is alignable with the axis of the hole, and a void at each intersection between the virtual conical surface and the plane of the light beam. As explained above, the void may define an incident path for the planar light beam on its way to the measurement surface (hole edge) and a reflected path for reflected light between the measurement surface and the detector.

Beam Guide for Surface Sub-Feature

It may be desirable to measure the fit (proud/recess/angle) of a sub-feature mounted on or within a surface of a structure. Examples are commonly found in the aerospace industry, e.g. fasteners including rivets, screws or bolts and the like. To measure accurately and consistently it is necessary to locate the sub-feature precisely in the image captured by the detector. However, the nature of certain sub-features (the fasteners mentioned above in particular) is that they exist in a very near to flush condition, especially at their edges. In other words, there may be minimal protrusion out of or recession into the surface. It may therefore be difficult to determine the edge of the sub-feature in an image captured by an optical triangulation sensor.

Moreover, if the sub-feature contains surface irregularities, such as embossing, engraving or the like, it can be difficult to distinguish the edge of the sub-feature from such irregularities.

In some circumstances, it may be desirable to measure the alignment (relative angle) of the sub-feature relative to the measurement surface. To achieve this is it also desirable to identify the edges of the sub-feature. Conventional systems suffer because the edges on the sub-feature cannot be accurately identified in a consistent manner.

At its most general, the third aspect of the invention provides an optical triangulation sensor having a surface contact portion which can aid visual positioning of the light source (and hence the planar light beam) with respect to a sub-feature and provide a marker on a captured image to facilitate accurate identification of the sub-feature.

With the invention, a user may be able to match visually part of the sensor with the sub-feature to be measured. A consistent mounting position of the sensor relative to the sub-feature can therefore be achieved, which can be used in the interpretation of the captured image. In particular, the surface contact portion may itself be part of the captured image to provide a reference point from which the sub-feature can be identified. Identification of the sub-feature using the reference point may be automated. This may further promote consistency and repeatability.

The sub-feature may be any self-contained aspect of the measurement surface, e.g. an object mounted in or on the surface or a contour or profile of the surface itself. The sub-feature may be a fastener, e.g. the head of a rivet, screw, bolt or the like.

Thus, according to the third aspect of the invention there may be provided an optical triangulation sensor for measuring properties of a sub-feature on a measurement surface, the sensor comprising: a light source arranged to emit a planar light beam; a detector located out of the plane of the light beam for detecting light from the planar light beam that is reflected at an angle to that plane; and a sub-feature locator attached to the light source, the sub-feature locator comprising an alignment element projecting from the light source to contact the measurement surface adjacent to the sub-feature, wherein the alignment element lies in the plane of the light beam to provide a marker in the detected light that is usable to locate the adjacent sub-feature.

The sub-feature locator may allow consistent and repeatable alignment of the plane of the light beam with respect to the sub-feature. The position of the measurement axis (i.e. the line formed on the measurement surface when the planar light beam is project thereon) relative to the sub-feature may be known more accurately, which can facilitate the accurate measurement of the profile (e.g. proudness, recess, angle and the like) of the sub-feature. This can reduce error and uncertainty associated with measurements made relying on user judgement. For example, sub-feature locator may be arranged to direct the plane of the light beam through the centre of the sub-feature when properly aligned therewith.

The alignment element may have a predetermined shape which is alignable with the shape of the sub-feature. For example, the alignment element may have an edge which conforms in shape to the edge of the sub-feature. The sub-feature locator may be customised for a particular size or shape of sub-feature. The sub-feature locator may be detachable from the light source, e.g. to permit different shapes of locator to be used with the same sensor.

The alignment element may include two marker portions which lie in the plane of the light beam, the marker portions being spaced apart to sit on either side of the sub-feature. In use, the sub-feature can be visually located by the user between the marker portions, which also provide reference points on the captured image that can be used to identify the sub-feature. Known properties e.g. dimensions of the sub-feature may also be used in determining its location relative to the marker portions. This may be relevant where the sub-feature is a standard component (e.g. rivet) having a known size.

The alignment element may be a frame defining an light-transmitting aperture whose shape conforms to the shape of the sub-feature. The aperture may therefore fit over the sub-feature. This can facilitate accurate location and orientation of the sensor (i.e. planar light beam and detector) relative to the sub-feature.

The aperture may be round, e.g. substantially circular, for fitting around a head of a fastener. In the case of measuring fasteners, the outward facing head of the fastener often has a series of depressions stamped or otherwise formed into its surface. These depression should be ignored when measuring the overall proud/recess/angle fit of the fastener. The marker(s) of the invention may permit the edges of the fastener to be distinguished in an automated fashion from the depressions. This permits consistent analysis of the condition (proud/recess) at the edges of the fastener and can also enable more accurate and repeatable calculation of the angle of the fastener head relative to the measurement surface.

The light source may include a laser. Any laser used in conventional optical triangulation sensor may be suitable. The laser may be class 3 or lower. For example, it may be a class 2M or 3R. The intensity of the laser may be adjustable (e.g. automatically adjustable) for different optical properties of surfaces to be measured.

The detector may be any suitable imaging device, e.g. a camera incorporating a charge coupled device (CCD) or an active pixel sensor (e.g. CMOS device).

Any of the features of the three aspects above may be combined.

BRIEF DESCRIPTION OF THE DRAWINGS

Embodiments of the invention are described below with reference to the accompanying drawings, in which.

DETAILED DESCRIPTION; FURTHER OPTIONS AND PREFERENCES

Each of the embodiments discussed below may be applied as an enhancement to a conventional optical triangulation sensor, e.g. the GapGun sensor manufactured by Third Dimension Software Limited, mentioned above.

Multiple Beam Emitter

FIGS. 6, 7 and 8A-8F relate to the first aspect of the invention. In the embodiments discussed below, a plurality of coplanar spatially separated planar light beams are produced from a conventional laser triangulation sensor by locating a mask at the output of the light source to block portions of a generated planar light beam.

Figure 6:
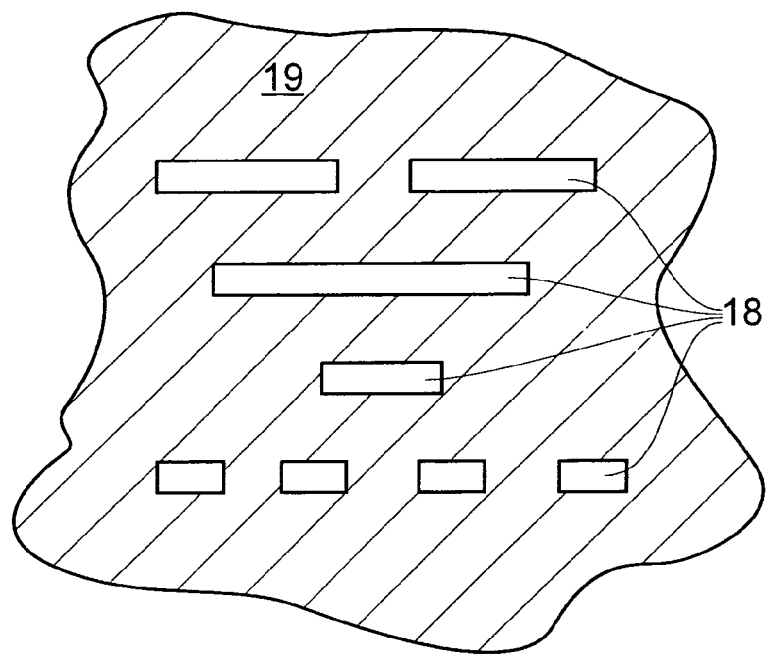
FIG. 6 is a plan view of a mask for an optical triangulation sensor that is an embodiment of the first aspect of the invention.

FIG. 6 shows a mask 19 that is suitable for use in the invention. In this embodiment, the mask 19 is made from a plate of opaque material (e.g. plastic, metal, glass or the like) with an arrangement of apertures 18 machined therethrough. Alternatively, the plate may be clear, and the apertures formed by suitable printing opaque material thereon. The mask may be made of partially opaque (translucent) material which alters a property e.g. intensity or colour or light transmitted therethrough. The apertures 18 are able to transmit light unaltered, thus, placing them in the plane of a planar light beam generated by a light source allows the mask 19 to selectively transmit portions of the planar light beam. Corresponding portions of the measurement surface upon which the planar light beam is incident are therefore not illuminated send no reflected light to a detector (camera) arranged to capture an image of the measurement surface.

The mask 19 in FIG. 6 has four rows of apertures, each row have a different aperture configuration. Each row may be selectively alignable with the planar light beam to produce different patterns for the emitted planar light. The middle two rows have single apertures which produce a single planar light beam similarly to conventional laser triangulation sensors. The aperture on the third row has a smaller width than the aperture on the second row, so the beam emitted when the third row is aligned with the planar light beam will have a narrower width accordingly. The top and bottom rows have a plurality of apertures (two and four respectively) for producing a plurality of spaced parallel planar light beams from the planar light beam output from the light source.

Thus, each aperture in the top and bottom rows can be considered to be separated by an opaque portion which restricts (blocks) passage of light to the measurement surface. This can prevent unwanted features of the measurement surface from being illuminated thereby eliminating them from the measurement. Moreover, the pattern projected by the plurality of spaced planar light beams (i.e. broken line) can be used to consistently position the planar light beam.

The mask 19 can be mounted in a housing (not shown) to be movable relative to the light source to permit different rows of apertures 18 to be used for different measurements. The configuration of apertures may be customised to produce patterns that are suitable for particular measurements.

Figure 1:
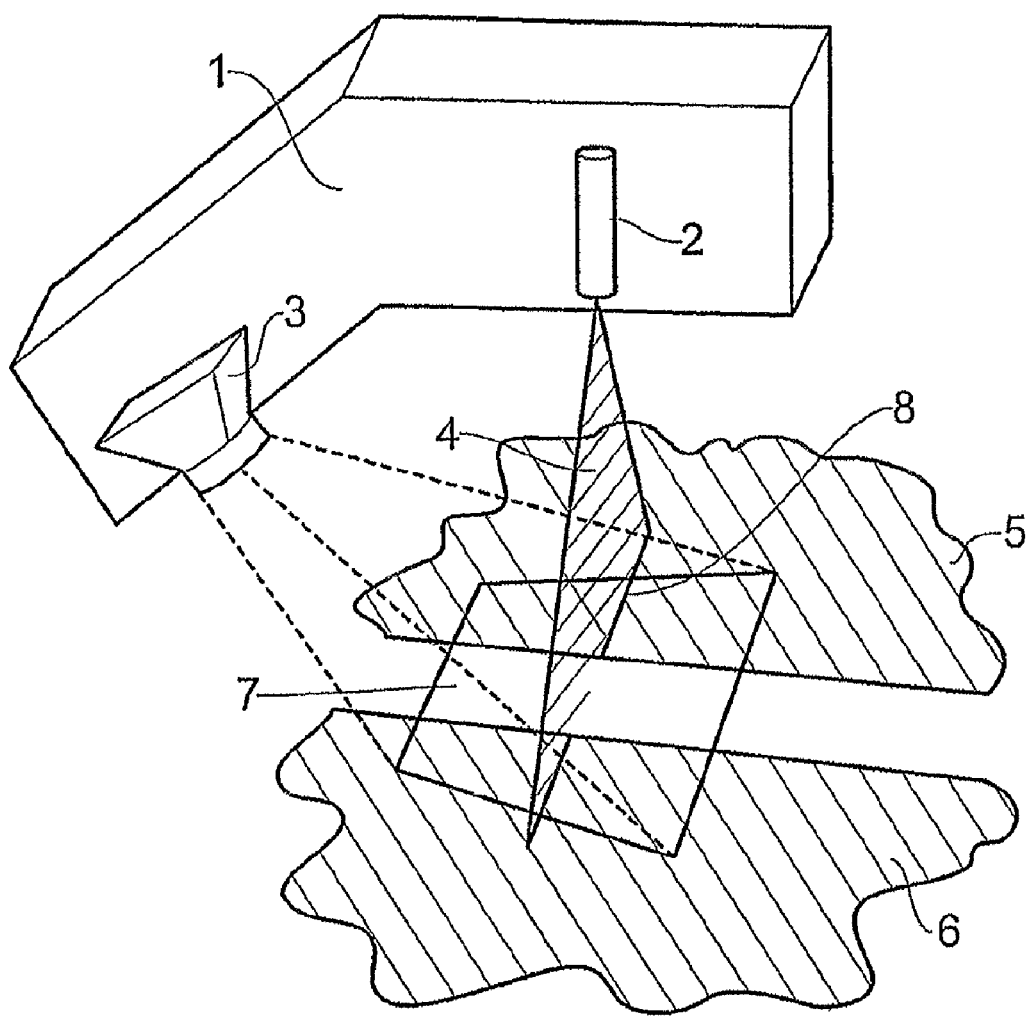
FIG. 1 is a schematic diagram of a conventional laser triangulation sensor and is discussed above.
Figure 7:
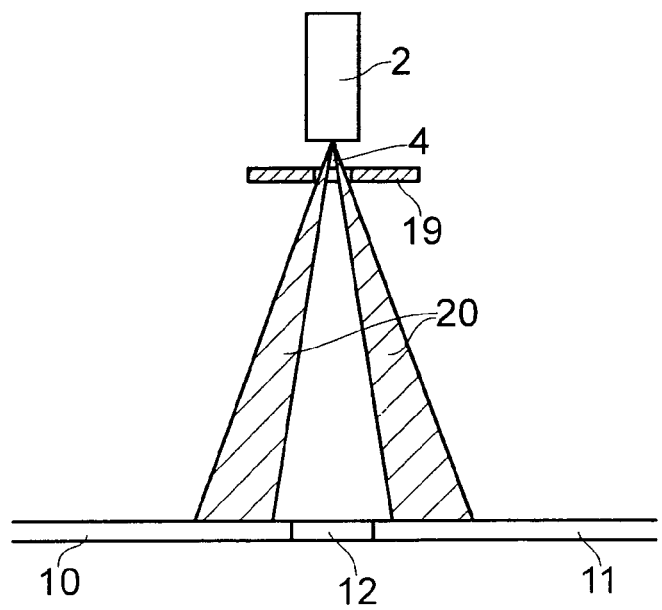
FIG. 7 is a schematic view of an optical triangulation sensor that is an embodiment of the first aspect of the invention.

FIG. 7 illustrates an embodiment of the first aspect of the invention where the mask 19 shown in FIG. 6 is mounted in a conventional laser triangulation sensor (e.g. of the type discussed with reference to FIG. 1). The top row of apertures 18 are aligned with the planar light beam 4 emitted by laser light source 2 to produce two spatially separated planar sub-beams 20.

Figure 2:
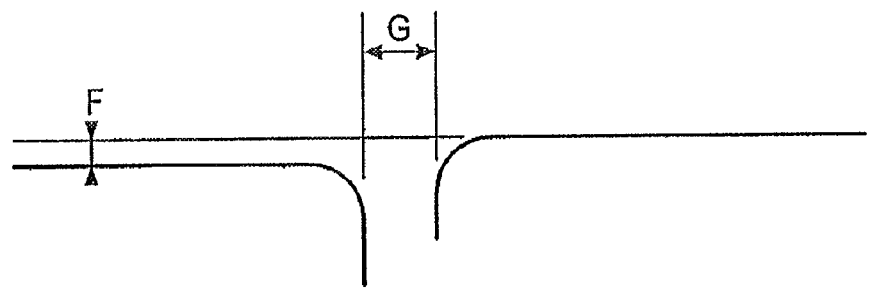
FIG. 2 is a cross-sectional view of a junction between two components illustrated a gap and flush condition and is also discussed above.
Figure 3:
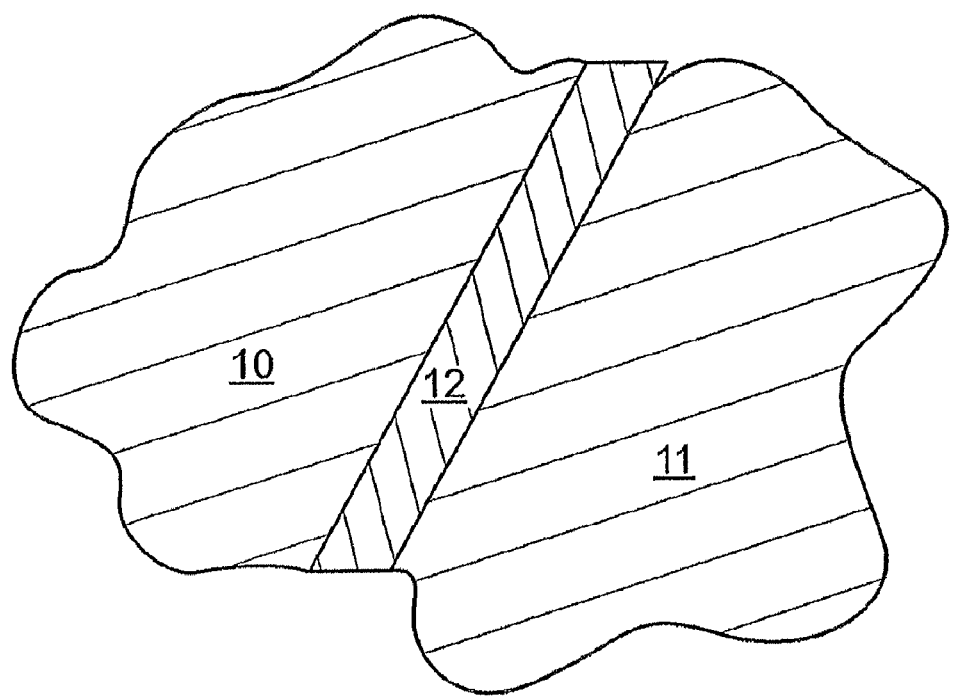
FIG. 3 is a plan view of a junction between two components in which the gap is filled with sealant and is also discussed above.
Figure 4:
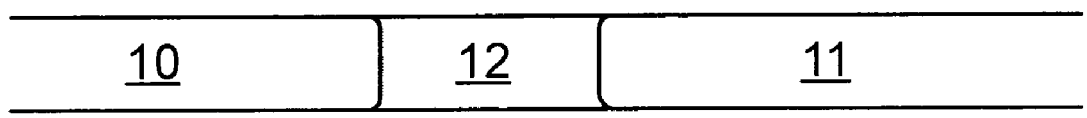
FIG. 4 is a cross-sectional view through the junction shown in FIG. 3 and is also discussed above.

This arrangement may be particularly suited for measuring the flush (or mismatch) F between two flat panels 10, 11 (see FIG. 2). The surfaces 10, 11 may be easily identified on the capture image by locating the break between the sub-beams 20 on the joint (e.g. sealant fillet 12) between them. The captured image will them only contain information about the surfaces 10, 11. Errors caused by mistakenly reading information from the sealant 12 can be avoided.

By separating the single projected line in this way the attributes of both surfaces 10, 11 and their relationship to each other can be identified.

Figure 5:
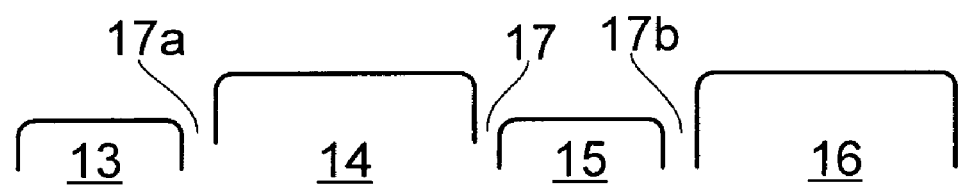
FIG. 5 is a cross-section view through a multi-component junction and is also discussed above.

The narrow aperture on the third row of the mask 19 may be aligned with the planar light beam from the light source 2 to facilitate measurement of a gap and/or flush condition of a specific junction which is in close proximity to other junction which exhibit similar properties (see FIG. 5). In this case, the mask 19 is used to restrict the planar light beam, i.e. reduce the length of the line projected by the planar light beam on to the surface. The user may direct the narrowed line to omit the unwanted features junctions from the measurement.

FIGS. 8A-8F illustrate a practical embodiment of a movable mask 19 mounted in a housing 34 for a laser triangulation sensor (not shown). The housing 34 is a round cap for mounting at the output of a laser (not shown) which is arranged to emit a planar beam of light. The mask 19 is mounted in the housing 34 so that apertures 18 are alignable with the plane of the light beam.

The mask 19 comprises three rows of apertures 18, and is movable (down and up in FIGS. 8A-8F) to selectively align each row with the plane of the light beam. In this embodiment, the movement mechanism comprising a positional pin 36 receivable in a curved groove 37. Relative rotation between the groove 37 and the pin 36 enables the pin to be located at different radial positions within the cap 34. For example, the groove may have a spiral-like form. In the embodiment, the groove 37 is machined into the cap 34, which is rotatable relative to the light beam produced by the laser. The mask 19 is constrained not to rotate with the cap 34 but is permitted move in an up/down direction. Accordingly, the positional pin 36, which is attached to the mask, translates in a straight line up and/or down when the cap is rotated.

In an alternative embodiment, the mask may be rotatable, and each set of apertures may be arranged to extend radially from an axis of rotation of the mask. The planar light beam may be offset from the axis of rotation such that the apertures can be selectively rotated in front of the light beam to restrict the projected light.

Figure 8E:
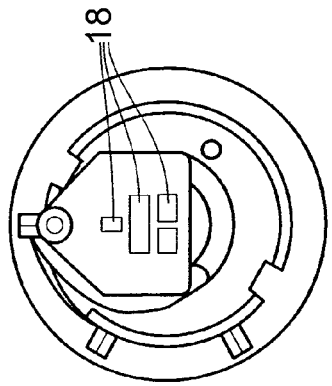
FIGS. 8A-8F are front and back views of various configurations of a movable mask for an optical triangulation sensor that is another embodiment of the first aspect of the invention.
Figure 8F:
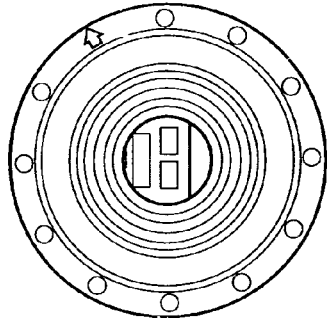
Figure 8C:
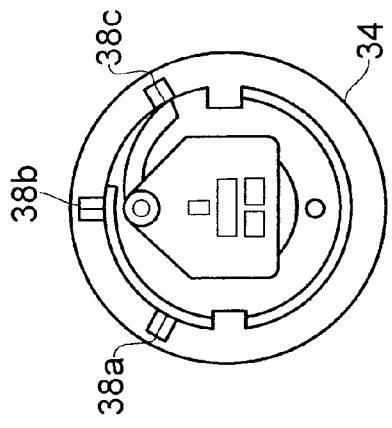

FIG. 8C shows three circumferential markers 38*a*, 38*b*, 38*c* on the inner edge of the cap 34. When each mark 38*a*, 38*b*, 38*c* is aligned with the positional pin 36 a corresponding one of the aperture rows is aligned with the planar light beam (not shown). FIGS. 8A, 8C and 8E show the three alignment positions with a narrow single aperture, a wide single aperture and a pair of apertures aligned with the planar light beam respectively.

Figure 8D:
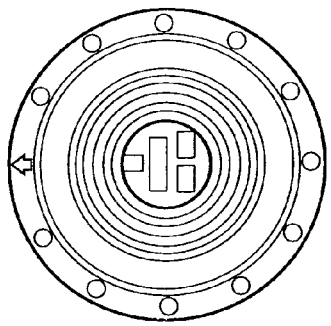
Figure 8A:
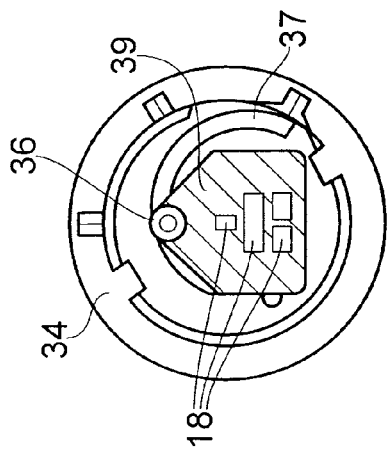
Figure 8B:
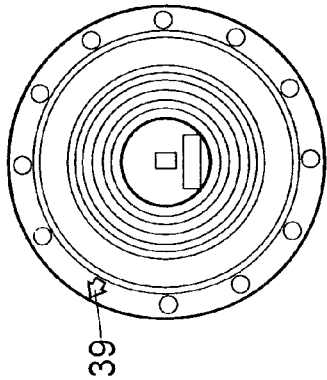

The outward facing side of the cap 34 is shown in FIGS. 8B, 8D and 8F. An arrow-shaped marker 39 is provided to indicate the rotation position of the cap 34 and hence which row of apertures in aligned with the plane of the light beam.

Beam Guide for Hole Measurement

Figure 9:
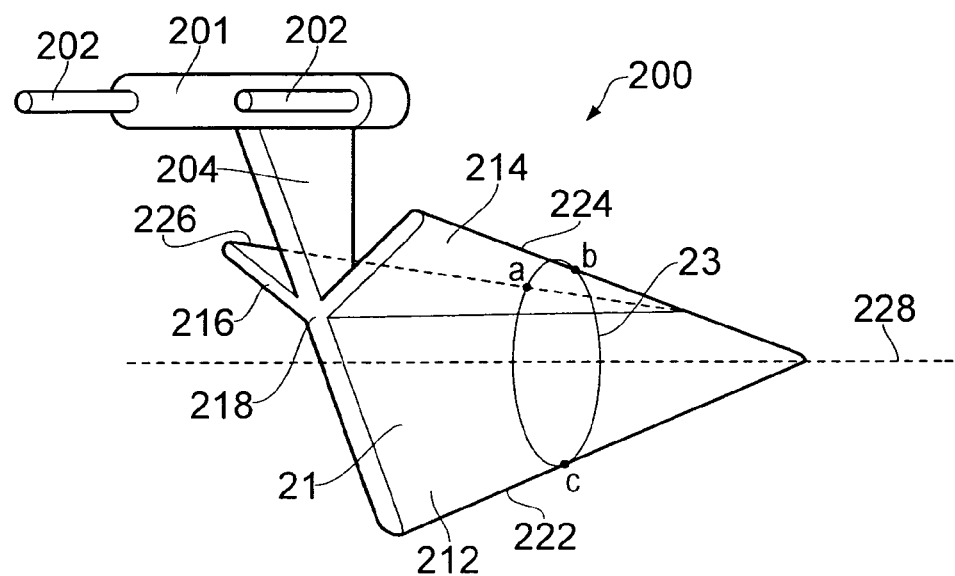
FIG. 9 is a perspective view of a guide element that is an embodiment of the second aspect of the invention.
Figure 10:
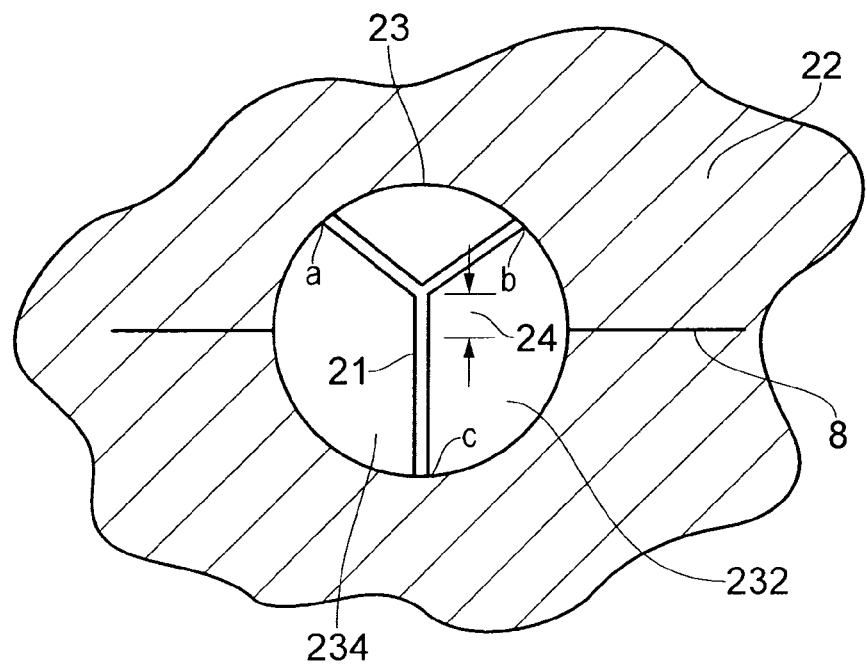
FIG. 10 is a cross-sectional view through the guide element shown in FIG. 9 when mounted in a hole.
Figure 11:
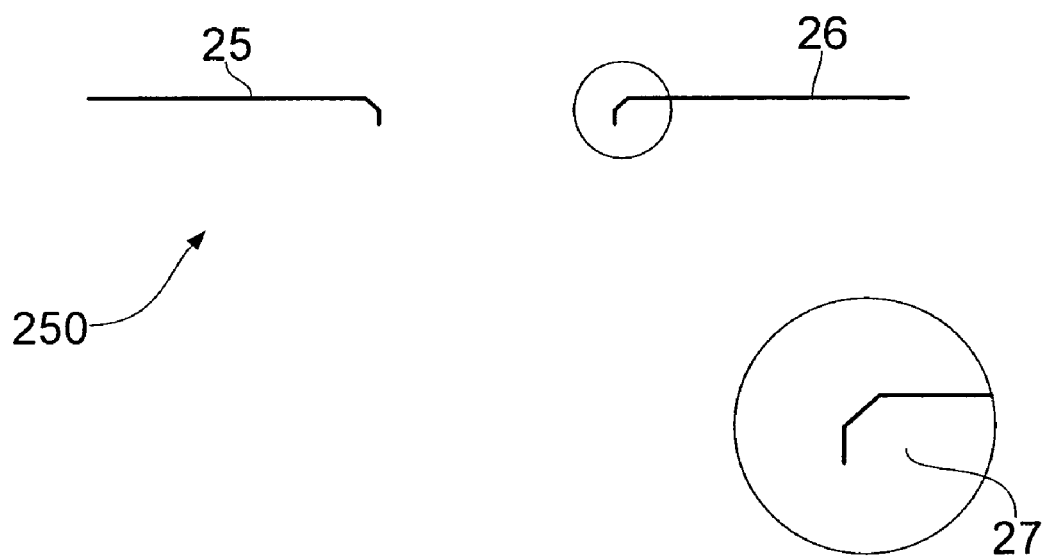
FIG. 11 is a schematic view of a data representation obtainable from an optical triangulation sensor mounted on the guide element in the position shown in FIG. 10.

FIGS. 9 to 11 relate to the second aspect of the invention.

FIG. 9 shows a guide element 200 that is attachable to a laser triangulation sensor (not shown). In the embodiment, attachment is effected by a plug 201 having two spaced projecting rods 202 which are receivable in corresponding holes formed in the sensor. The guide element 200 comprises a body 21 which is attached to the plug 201 by a stem 204. The body 21 is offset from the plug such that it intersects a planar light beam emitted by a light source in the sensor. The plug 201, stem 204 and body 21 are arranged so that the body occupies a particular (predetermined) orientation with respect to the plane of the light beam.

The body 21 comprises three fins 212, 214, 216 which extend away from a common junction 218. The fins 212, 214, 216 are located at equal angular intervals around the common junction 218. The fins 212, 214, 216 are tapered such that their distal edges 222, 224, 226 (the edges opposite the common junction 218) lie on a virtual conical surface. The body 21 therefore has a pointed shape. The pointed end is receivable is a hole whereby the distal edges 222, 224, 226 each contact points on the edge of the hole (e.g. for a hole corresponding to circle 23, contact may be at points a, b, c) to provide secure positioning of the guide element 200 (and therefore sensor) relative to the hole.

The fins 212, 214, 216 are shaped so that the virtual conical surface has an axis 228 which lies in the plane of the light beam emitted by the light source. The guide element 200 may therefore securely locate the planar light beam across a diameter of a hole because the fins 212, 214, 216 are shaped to enable alignment of the virtual conical axis 228 with the axis of the hole.

The fins 212, 214, 216 are further configured to avoid obstructing the planar light beam both on its way to the edge of the hole (incident path) and on its way back from the hole to a detector located out of the plane of the light beam (reflected path). For secure mounting, the contact surfaces provided by the distal edges 222, 224, 226 of the fins 212, 214, 216 are provided on both sides of the plane of the light beam. However, to reduce obstruction, the common junction 218 is offset by spacing (see FIG. 10) from the plane of the light beam. In this embodiment, the common junction 218 is located on the opposite side of the plane of the light beam from the return path. Thus, only lower fin 212 intersects with the incident and reflected paths.

As shown in FIG. 10, the fins 212, 214, 216 effectively define voids 232, 234 through which the incident and reflected paths pass in a substantially unobstructed manner. FIG. 10 is a cross-section through a hole 23 formed in an object surface 22 in which the body 21 of the guide element 200 has been placed. Here is can be seen that the line 8 projected on the surface 22 by the planar light beam lies across the diameter of the hole 23.

The guide element 200 permits stable and repeatable mounting in a variety of hole sizes. By positioning the guide element 200 so that the axis of the virtual conical surface is in the plane of the light beam, the measurement of the diameter of a hole and the profile of its edges can be accurately and repeatably determined.

FIG. 11 illustrates an example of a data representation 250 obtainable using the sensor described above. The data representation 250 contains edge data 25, 26 corresponding to each side of the hole and detailed profile data 27 about the right hand edge. The guide element 200 ensures that the spacing between the edge data corresponds to a diameter of the hole, which can facilitate subsequent calculations.

Beam Guide for Surface Sub-Feature

Figure 12:
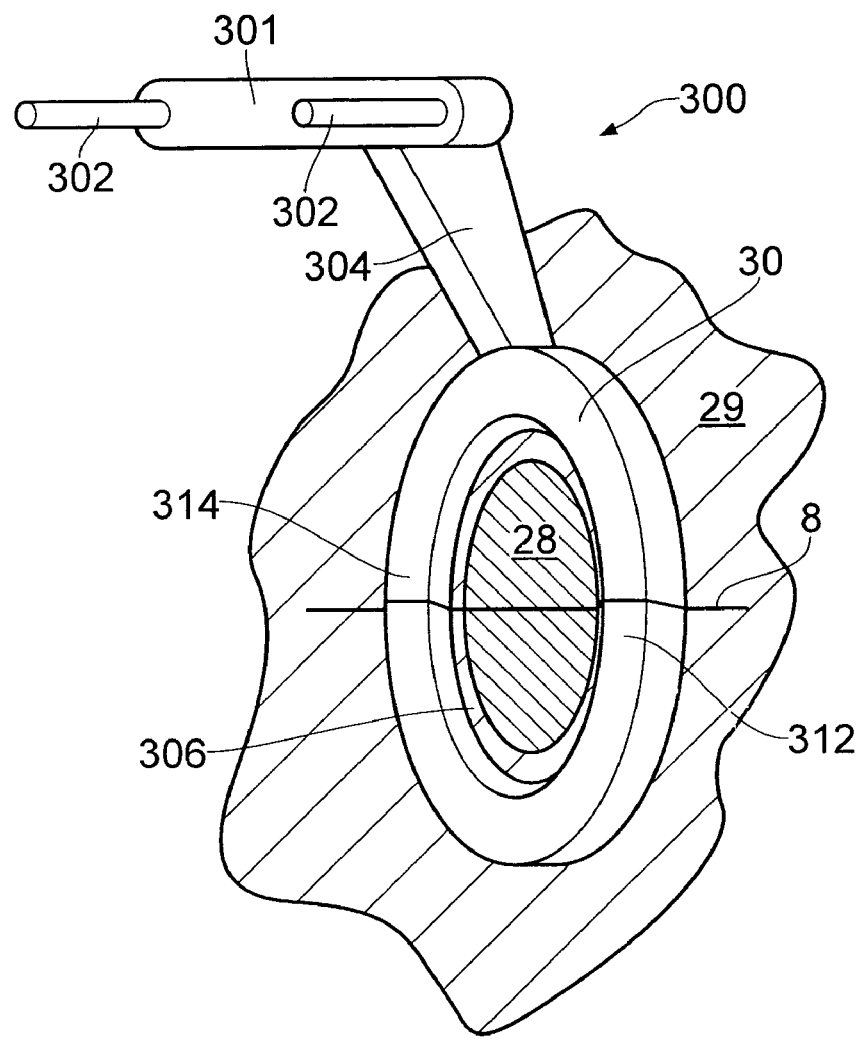
FIG. 12 is perspective view of a sub-feature locator that is attached to an optical triangulation sensor which is an embodiment of the third aspect of the invention.
Figure 13:
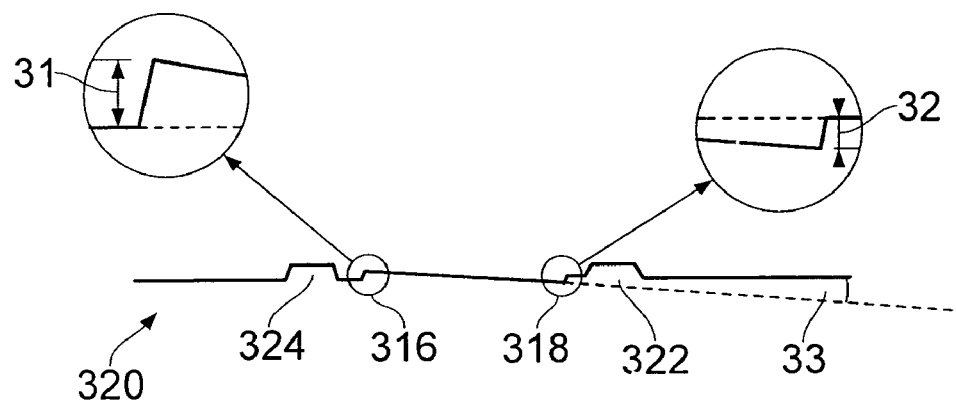
FIG. 13 is a schematic view of a data representation obtainable from the optical triangulation sensor when mounted in the position shown in FIG. 12.

FIGS. 12 and 13 relate to the third aspect of the invention.

FIG. 12 shows a guide element 300 that is attachable to a laser triangulation sensor (not shown). In the embodiment, attachment is effected by a plug 301 having two spaced projecting rods 302 which are receivable in corresponding holes formed in the sensor. The guide element 300 comprises a annular body 30 which is attached to the plug 301 by a stem 304. The body 30 is offset from the plug 301 such that it intersects a planar light beam emitted by a light source in the sensor. The plug 301, stem 304 and body 30 are arranged so that the body occupies a particular (predetermined) orientation with respect to the plane of the light beam. In this embodiment, the planar light beam bisects the annular body 30.

The annular body 30 defines a circular light transmitting window 306 which is shaped to frame a fastener 28 that is mounted substantially flush with a measurement surface 29. As shown in FIG. 12, aligning the window 306 with the fastener 28 causes the line 8 projected on to the surface 29 by the planar light beam to pass through the centre of the fastener 28. Moreover, since the body 30 passes around the fastener, there are two side portions 312, 314 which intersect with the planar light beam. Thus, an image of these side portions 312, 314 may be captured by the sensor to facilitate identification of the fastener 28 on the captured image.

FIG. 13 is a schematic picture of a data representation 320 generated from an image of the line 8 on the object 29, fastener 28 and body 30 shown in FIG. 12. The side portions 312, 314 show up as marker regions 322, 324 on the data representation. The knowledge that these marker portions frame the fastener, together with knowledge about the diameter of the window 306 and/or the diameter/width of the fastener 28 can be used to determine the location of the edges 316, 318 of the fastener 28 on the data representation 320 in a consistent and repeatability manner.

After the edges 316, 318 are identified, further information can be obtain from the data representation 320. For example, the maximum protrusion 31 and/or recess 32 which the fastener 28 sits above/below the surface 29 can be obtained, or the angle 33 at which the feature 28 sits relative to the surface of the object 29 can be extracted from the data. Knowing accurately the location of the fastener can reduce errors in these calculations.

The invention claimed is:

1. An optical triangulation sensor comprising:
   a light source comprising
      a beam generator for generating a planar light beam, and
      a mask lying in the plane of the planar light beam, the mask being arranged to generate a plurality of discrete planar light beams from the planar light beam, the plurality of discrete planar light beams lying spatially separated from each other along a common plane in the field of view of the sensor, such that when the plurality of discrete planar light beams are projected on to a measurement surface located in the field of view of the sensor a plurality of lines corresponding to the plurality of discrete planar light beams is formed on the measurement surface; and
   a detector located out of the common plane for detecting light from the plurality of discrete planar light beams that is reflected at an angle to the common plane.

2. An optical triangulation sensor according to claim 1, wherein the planar light beam lies on the common plane and the mask includes one or more opaque portions locatable in the common plane, each opaque portion being arranged to block part of the planar light beam.

3. An optical triangulation sensor according to claim 2, wherein the mask is adjustable to vary the number or configuration of the plurality of discrete planar light beams.

4. An optical triangulation sensor according to claim 1, wherein the mask is adjustable to vary the number or configuration of the plurality of discrete planar light beams.

5. An optical triangulation sensor according to claim 1, wherein the mask is a generally opaque plate positioned to block the planar light beam, the plate having a plurality of window portions therethrough which are locatable on the common plane to transmit spaced portions of the planar light beam.

6. An optical triangulation sensor according to claim 5, wherein the opaque plate is movable relative to the common plane to locate different combinations of window portions on the common plane, thereby to permit the number or configuration of the plurality of discrete planar light beams to be altered.

7. An optical triangulation sensor according to claim 1, wherein the light source includes a laser.

8. An optical triangulation sensor according to claim 1, wherein the detector is an imaging device.

9. An optical triangulation sensor according to claim 8, wherein the imaging device includes a charge coupled device (CCD) or an active pixel sensor.

10. An optical triangulation sensor according claim 8, wherein the imaging device is a camera.

11. An optical triangulation sensor comprising:
    a light source arranged to emit a planar light beam;
    a detector located out of the plane of the light beam for detecting light from the planar light beam that is reflected at an angle to that plane; and
    a mask for restricting one or more portions of the emitted planar light beam to produce an output planar light beam having a predetermined configuration.

12. An optical triangulation sensor according to claim 11, wherein the light source includes a laser.

13. An optical triangulation sensor according to claim 11, wherein the detector is an imaging device.

14. An optical triangulation sensor according to claim 13, wherein the imaging device includes a charge coupled device (CCD) or an active pixel sensor.

15. An optical triangulation sensor according to claim 13, wherein the imaging device is a camera.

* * * * *